Aug. 19, 1941.　　　　L. P. SMITH　　　　2,252,990
BAKING DEVICE
Filed Feb. 24, 1940　　　　2 Sheets-Sheet 1
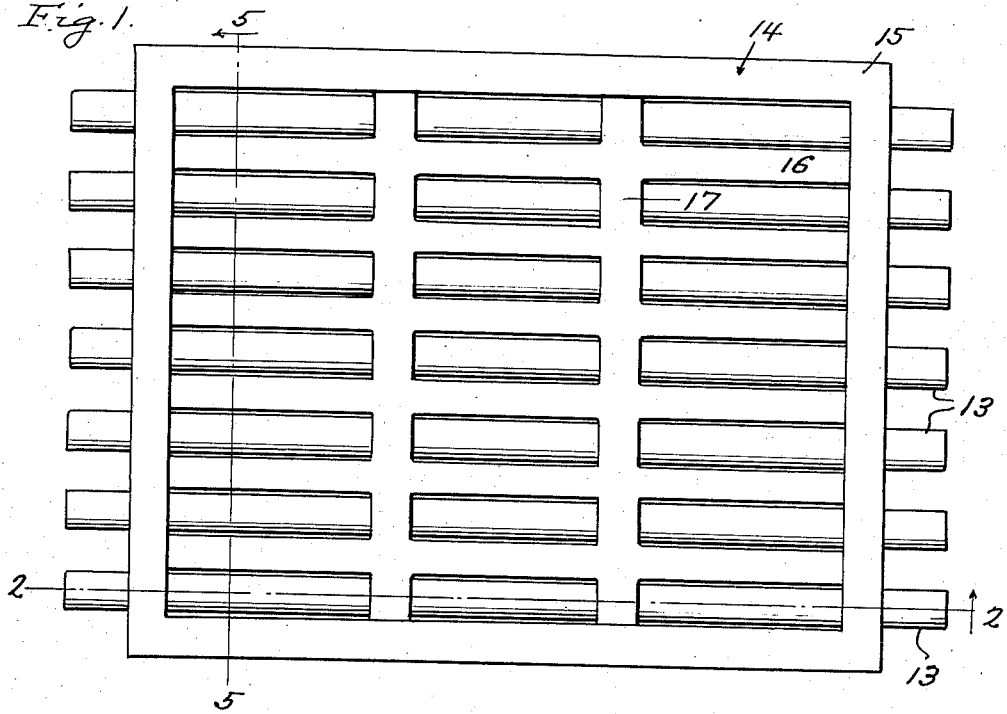
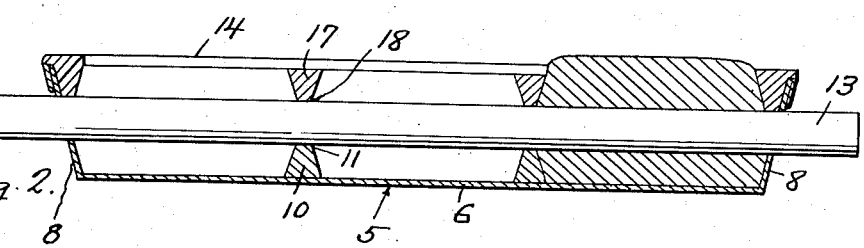
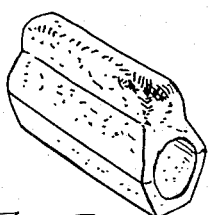
Inventor
Lewis P. Smith
By Clarence A. O'Brien
and Hyman Berman
Attorneys Aug. 19, 1941.         L. P. SMITH         2,252,990
BAKING DEVICE
Filed Feb. 24, 1940         2 Sheets-Sheet 2
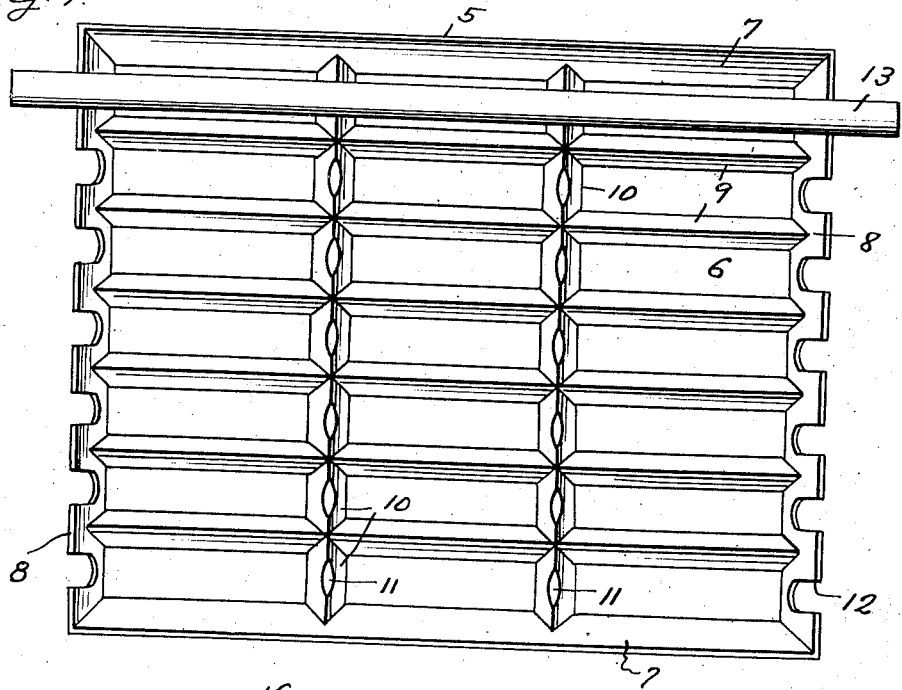
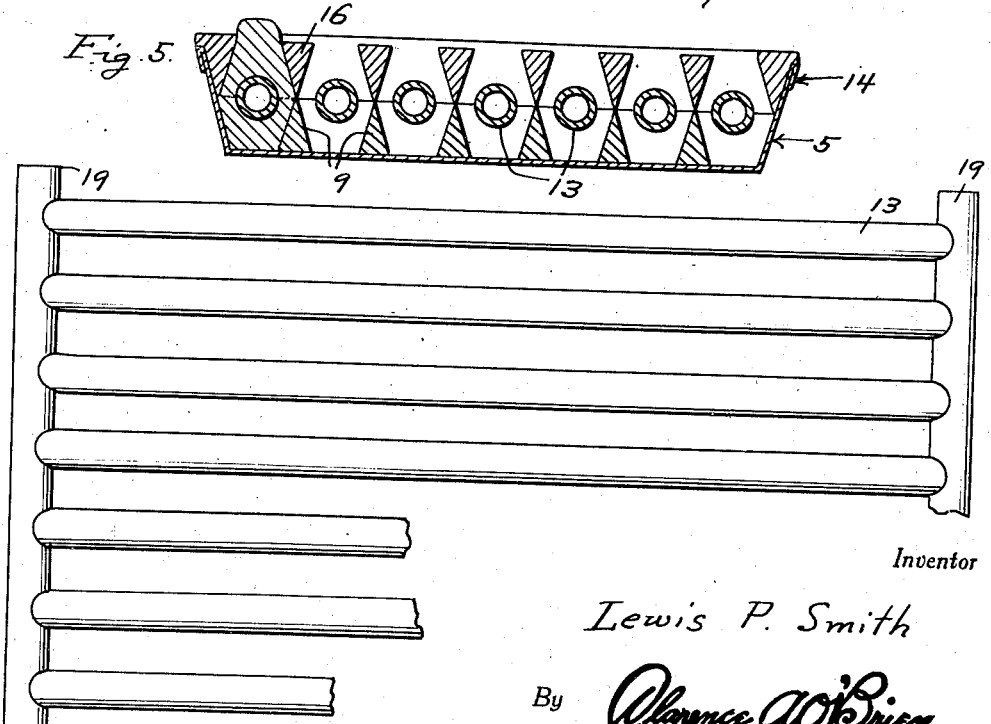
Inventor
Lewis P. Smith
By Clarence A. O'Brien
and Hyman Berman
Attorneys Patented Aug. 19, 1941

2,252,990

UNITED STATES PATENT OFFICE 2,252,990

BAKING DEVICE

Lewis P. Smith, Fulton, N. Y.

Application February 24, 1940, Serial No. 320,630

8 Claims. (Cl. 53—6)

This invention relates to a baking pan especially constructed for the forming and baking of dough into rolls or pastry in clustered or grouped formation, and has for the primary object the provision of a device of this character which will form each roll or pastry of hollow formation so that a sandwich or the like may be conveniently made therefrom by simply arranging therein the desired filler and also will connect the rolls or pastry in such a way that they may be easily separated for individual use.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a baking device constructed in accordance with my invention.

Figure 2 is a sectional view taken on the line 2—2 of Figure 1.

Figure 3 is an end elevation illustrating the device.

Figure 4 is a top plan view illustrating the pan parts with the upper structure or frame removed.

Figure 5 is a sectional view taken on the line 5—5 of Figure 1.

Figure 6 is a fragmentary top plan view illustrating a modification of a portion of the present invention.

Figure 7 is a perspective view illustrating one of the rolls or pastry baked by the present invention.

Referring in detail to the drawings, the numeral 5 indicates a pan including a bottom wall 6, upstanding side and end walls 7 and 8. It is preferable that the walls 7 and 8 incline upwardly and outwardly from the bottom wall. Formed on the walls of the pan are longitudinally and transversely extending ribs 9 and 10 each of substantially triangular shape having its apex disposed uppermost. The securing of the ribs on the walls of the pan can be carried out in any well known manner and it is preferable that the ends of said ribs be beveled so as to have interfitting connections with each other. The transverse ribs 10 are provided with notches 11 which align with notches 12 formed in the end walls 8 of the pan for the purpose of forming seats for hollow core tubular members 13, the ends of which project a limited distance beyond the end walls of the pan.

By referring to Figure 5, it will be seen that when the tubular members 13 are positioned within the notches 12 that approximately one-half of the external diameter of said members are also exposed above about the apexes of the ribs 9 and 10.

A frame 14 is shaped to match the upper edges of the upstanding walls of the pan and is provided with grooves to receive said walls. The frame 14 is of skeleton formation by including a main frame portion 15 having integral therewith longitudinally and transversely extending ribs 16 and 17. These ribs 16 and 17 are of triangular shape in cross section with their apexes disposed downwardly to contact the apexes of the ribs 9 and 10 when the frame 14 is positioned on the pan 5. The transversely arranged ribs 17 are provided with notches 18 to coact with the notches 11 in receiving the members 13.

As shown in the modification in Figure 5 the parallel members 13 may be integrally connected with each other by end members 19 whereby to hold said members 13 in assembled grid-like form for placement in the notches of the pan.

In operation, dough is arranged in the pan 25 between the ribs thereof and the members 13 are then positioned in the notches of the pan and the ribs thereof contacting the dough. Another layer of dough is then placed on top of the members 13 and the frame 14 is positioned on the pan so that ribs thereof contact the ribs of the pan. The pan thus filled with dough is placed in an oven and baked at a desired temperature so that rolls or pastry will be produced in clustered or grouped formation with each roll provided with an opening extending from end to end thereof as shown in Figure 7. Prior to removing the clusters or groups of rolls from the pan after the baking operation, the tubular members are removed endwise from the pan or if the form or type of members 13 as shown in Figure 5 are employed the frame is first lifted off of the pan and then the members 13 lifted off of the pan carrying therewith the rolls. To remove the rolls from said members 13 when the latter are connected together it is necessary that the rolls be severed longitudinally thereof. However, when the members 13 are non-connected, as shown in Figure 1, the members 13 may be removed endwise of the pan leaving the rolls therein with the rolls connected in clustered or grouped formation. The ribs of the frame and the pan coact in forming the dough during the baking operation so that the rolls will be joined by comparatively thin and narrow portions, which portions permit the rolls to be easily separated from each other when desired for individual use. By having passages or bores extending from end to end will permit the rolls to be easily filled with a desired filler or ingredient for forming a sandwich or the like.

It is believed that the foregoing description, when taken in connection with the drawings, will fully set forth the construction and advantages of this invention to those skilled in the art to which such a device relates, so that further detailed description will not be required.

Having thus described the invention, what I claim is:

1. In a baking device of the class described, a pan including a bottom wall and upstanding end and side walls, longitudinally and transversely arranged ribs carried by the walls of the pan and each of substantially triangular shape in cross section, said transversely extending ribs having notches, said end walls having notches aligning with the notches of said ribs, tubular members resting in the respective notches, a frame grooved to receive the upstanding walls, and longitudinally and transversely arranged ribs on said frame and each of triangular formation to contact the ribs of said pan and certain of said ribs of the frame having notches to receive the tubular members.

2. In a baking device of the class described, a pan including a bottom wall and upstanding end and side walls, longitudinally and transversely arranged ribs carried by the walls of the pan, said transversely extending ribs having notches, said end walls having notches aligning with the notches of said ribs, core members resting in the co-acting notches, an open-work frame adapted to removably receive the upstanding pan walls, and provided with longitudinally and transversely arranged ribs contacting the ribs of said pan, and certain of said ribs of the frame having notches to receive said core members, and transverse rod members rigidly connecting said core members in assembled spaced relation.

3. A baking device comprising a pan including longitudinally and transversely arranged ribs, an open-work frame including longitudinally and transversely arranged ribs coactive with the pan and forming in the latter a plurality of individual dough-receiving spaces.

4. A baking device comprising a pan including longitudinally and transversely arranged ribs, an open work frame including longitudinally and transversely arranged ribs coactive with the pan and forming in the latter a plurality of individual dough-receiving spaces, said pan and certain of the ribs of the latter and the frame having notches, and core members arranged in the notches.

5. A baking device comprising a pan including longitudinally and transversely arranged ribs, an open work frame including longitudinally and transversely arranged ribs coactive with the pan and forming in the latter a plurality of individual dough-receiving spaces, said pan and certain of the ribs of the latter and the frame having notches and transverse rod members rigidly connecting said tubular members in assembled spaced relation.

6. A multiple roll molding and baking structure of the class described comprising a pan having a bottom and upstanding marginal surrounding walls, there being longitudinal side walls and transverse end walls, said end walls having keeper notches formed therein at longitudinally spaced points, a plurality of longitudinal triangular ribs on the interior of the bottom of the pan, complemental transverse ribs intersecting the longitudinal ribs, said transverse ribs being of triangular cross-sectional form and the apex portions thereof having notches aligned with the notches in the end walls of said pan, all of said ribs being of a vertical height less than the depth of the pan, core-forming rods seated in the respective notches of the transverse ribs and said end walls, the rods extending through and beyond the last-named notches to facilitate grasping and endwise removal when the baking of the dough has been completed, and a detachable grid-like dough molding frame unit including a frame removably seated on the pan walls and having longitudinal and transverse intersecting ribs cooperable with the pan ribs, said grid frame ribs corresponding in cross-sectional shape to the pan ribs and being arranged so that the apices of the respective sets of ribs coordinate in superposed contacting relationship.

7. As a new product of manufacture and as a component part of a structural assemblage of the class described, a dough-molding and baking pan comprising a bottom and upstanding marginal walls, there being longitudinal side walls and transverse end walls, the end walls being provided with core-accommodation and retention notches, and a plurality of ribs formed internally and integral with the walls of the pan, there being parallel ribs and transverse ribs, said ribs being of a vertical cross-sectional height less than the depth of the pan and the transverse ribs being provided in their crown portions with notches in alignment with the first-named notches.

8. As a new article of manufacture and as a component part of a roll-forming and baking device of the class described, a grid-like frame structure including a frame proper, the end and side bars of the latter being of triangular cross-section and including outwardly arranged grooves providing marginal seats for removable telescopic reception of complemental pan walls, said frame further including longitudinal and transverse intersecting ribs forming an open-work-grille, the ribs being triangular in cross-section and the transverse ribs having notches to accommodate cooperable core elements.

LEWIS P. SMITH.